(12) United States Patent
Muehlegger (10) Patent No.: US 11,408,477 B2
(45) Date of Patent: Aug. 9, 2022

(54) FRICTION DEVICE (71) Applicant: Miba Frictec GmbH, Laakirchen (AT)

(72) Inventor: Markus Muehlegger, Pinsdorf (AT)

(73) Assignee: Miba Frictec GmbH, Laakirchen (AT)

( * ) Notice: Subject to any disclaimer, the term of this patent is extended or adjusted under 35 U.S.C. 154(b) by 71 days.

(21) Appl. No.: 16/857,265

(22) Filed: Apr. 24, 2020

(65) Prior Publication Data

US 2020/0378461 A1 Dec. 3, 2020

(30) Foreign Application Priority Data

May 28, 2019 (AT) .............. A 50485/2019

(51) Int. Cl.
*F16D 69/04* (2006.01)
*F16D 65/092* (2006.01)

(52) U.S. Cl.
CPC ....... *F16D 69/0416* (2013.01); *F16D 65/092* (2013.01); *F16D 2069/0433* (2013.01)

(58) Field of Classification Search
CPC ......... F16D 69/0416; F16D 2069/0433; F16D 65/092
See application file for complete search history.

(56) References Cited

U.S. PATENT DOCUMENTS

| | | | |
|---|---|---|---|
| 2,264,192 A * | 11/1941 | Wellman .............. | F16D 13/64 192/107 C |
| 4,377,225 A * | 3/1983 | Lech, Jr. .............. | F16D 13/64 192/107 C |
| 4,941,558 A | 7/1990 | Schraut | |
| 5,048,659 A | 9/1991 | Tojima | |
| 5,791,443 A * | 8/1998 | Manz .................. | F16D 65/08 188/250 B |
| 5,850,899 A | 12/1998 | Drexl | |
| 5,857,551 A * | 1/1999 | Yoneda ............... | F16D 13/64 192/107 C |
| 6,015,035 A * | 1/2000 | Mizukami ........... | F16D 13/64 192/107 C |
| 8,844,686 B2 | 9/2014 | Muehlegger | |
| 10,718,392 B2 | 7/2020 | Fuderer et al. | |
| 2016/0201735 A1* | 7/2016 | Muehlegger ........ | F16D 13/64 192/107 R |
| 2017/0023071 A1* | 1/2017 | Basiewicz ........... | F16D 13/64 |

(Continued)

FOREIGN PATENT DOCUMENTS

| | | | |
|---|---|---|---|
| AT | 520092 A4 * | 1/2019 | |
| CN | 1105506 A | 7/1995 | |

(Continued)

*Primary Examiner* — Pamela Rodriguez
(74) *Attorney, Agent, or Firm* — Collard & Roe, P.C.

(57) ABSTRACT

A friction device has a carrier element and friction lining segments arranged thereon, wherein the friction lining segments each include one sintered friction lining arranged on a friction lining carrier, the friction lining carrier being connected to the carrier element by fastening elements, and several fastening elements being arranged per friction lining segment, wherein one fastening element is located on a first circular path having a first diameter, and one fastening element is located on a second circular path having a second diameter, and wherein the ratio of the first diameter of the first circular path to the second diameter of the second circular path is selected from a range from 1.2 to 1.5.

11 Claims, 6 Drawing Sheets

(56) References Cited

U.S. PATENT DOCUMENTS

| | | |
|---|---|---|
| 2018/0291972 A1 | 10/2018 | Fuderer et al. |
| 2019/0247368 A1 | 8/2019 | Bingaman et al. |
| 2020/0025263 A1 | 1/2020 | Stope |

FOREIGN PATENT DOCUMENTS

| | | |
|---|---|---|
| CN | 105840697 A | 8/2016 |
| CN | 106257083 A | 12/2016 |
| CN | 109804172 A | 5/2019 |
| DE | 197 39 198 A1 | 3/1999 |
| DE | 10 2013 106 090 A1 | 12/2014 |
| DE | 10 2014 119 489 A1 | 6/2016 |
| DE | 10 2015 211 274 A1 | 12/2016 |
| EP | 0 647 792 A1 | 4/1995 |
| WO | 2010/135757 A1 | 12/2010 |

\* cited by examiner

FRICTION DEVICE

CROSS REFERENCE TO RELATED APPLICATIONS

Applicant claims priority under 35 U.S.C. § 119 of Austrian Application No. A 50485/2019 filed May 28, 2019, the disclosure of which is incorporated by reference.

BACKGROUND OF THE INVENTION

1. Field of the Invention

The invention relates to a friction device having a carrier element and friction lining segments arranged thereon, wherein the friction lining segments each comprise a sintered friction lining arranged on a friction lining carrier, the friction lining carrier being connected to the carrier element by means of fastening elements, and several fastening elements being arranged per friction lining segment, wherein one fastening element is located on a first circular path having a first diameter, and one fastening element is located on a second circular path having a second diameter.

The invention further relates to a pack of friction devices comprising friction devices in the form of outer discs and inner discs alternately arranged in an axial direction.

2. Description of the Related Art

In modern technology, friction linings from sintered material are used, for example, as brake linings or clutch linings in automotive technology. To adapt the properties of the friction lining perfectly to the required purpose, different materials are mixed in variable proportions and subsequently sintered with a sintering process, which is known in principle, into a component of a desired shape.

As regards their properties, the sintered friction linings are usually optimized with respect to their friction force; as a result, other properties are rather poor. For example, sintered friction linings can only absorb low tensile and bending forces, which is why friction linings are usually applied on carrier plates, for example made of steel, to facilitate long service life of a brake or a clutch. Said carrier plate, which is provided with the friction lining, is then riveted onto the brake disc or the clutch plate. Thus, the friction lining serves the primary function of a brake or a clutch, i.e. for transmitting a braking torque or a torque between the driving side and the driven side, while the carrier layer has the function to connect the friction elements to the clutch plate or the brake.

For the riveting, each carrier element has corresponding boreholes, which are located at the edge or in the area of the friction element, depending on the design. If the boreholes are located in the area of the friction surface, the friction layer must contain a corresponding borehole for receiving the rivet head as well.

Such a friction lining is, for example, known from WO 2010/135757 A1, which describes a friction lining (1) from sintered material, comprising at least two areas spaced apart from each other, each for receiving a connecting element for assembling the friction lining on a carrier element, wherein the at least two areas are arranged in a joint recess in the friction lining. The recesses in the friction lining are continuous through the friction lining.

SUMMARY OF THE INVENTION

It is the object of the invention to create a friction device/a pack of friction devices that resists high mechanical load.

In the friction device mentioned at the beginning, the object of the invention is achieved by the ratio of the first diameter of the first circular path to the second diameter of the second circular path being selected from a range from 1.2 to 1.5.

The object of the invention is further achieved by the pack of friction devices mentioned at the beginning, wherein at least one of the friction devices is formed according to the invention.

It is advantageous in this regard that the loads exercised on the friction linings and the friction device by centrifugal/shear forces may be reduced. By selecting the position of the fastening elements from the range of diameter ratios, the load caused by centrifugal/shear forces at all rivets may be distributed approximately evenly. This in turn allows reducing the size of the aforementioned recesses in the friction linings for arranging or receiving the fastening elements. As a result, the available friction surface may be increased, or, if the friction surface remains the same, the friction linings and thus the friction device may be reduced in size, which may achieve additional reduction of the load on the friction linings and the friction device caused by centrifugal/shear forces. As a consequence of the smaller/more even load on the fastening means, it is additionally possible to use shared components for fastening the friction linings, for example for riveting.

For further improving these effects, the friction device may be formed according to at least one of the following embodiments, wherein
  fastening elements arranged adjacent to each other in the circumferential direction of the friction device include an angle from a range from 22° to 38°, and/or
  a radial distance between the two fastening elements is between 60 mm and 110 mm, and/or
  a radially outer fastening element is offset by an offset angle to a radially inner fastening element in the circumferential direction of the friction device, wherein it may be provided according to one embodiment that the offset angle is selected from a range of +/−2°, and/or
  two radially inner fastening elements are arranged, wherein one is arranged on a third circular path having a third diameter, wherein the third diameter differs from the second diameter by a value selected from a range of +/−3 mm, and/or
  two radially outer fastening elements are arranged, wherein one is arranged on a fourth circular path having a fourth diameter, wherein the fourth diameter differs from the first diameter by a value selected from a range of +/−5 mm.

It may be provided according to another embodiment of the friction device that the sintered friction linings are provided with further recesses, in particular breakthroughs. By means of these further recesses, the contact zone of the respective friction lining may be reduced in areas with higher loads. Although this entails reduction of the friction surface, the durability of the friction lining may be achieved with this embodiment by reducing wear caused by thermal effects.

Preferably, the friction device is a friction disc or a clutch plate.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

First of all, it should be noted that in the embodiments described in different ways, identical parts are given identical reference numbers or identical component names, and the disclosures contained in the entire description may be correspondingly applied to identical parts with identical reference numbers or identical component names. Moreover, the position indications used in the description, such as at the top, at the bottom, lateral, etc., directly refer to the figure shown and described, and, if a position changes, said position indications are to be correspondingly applied to the new position.

Figure 1:
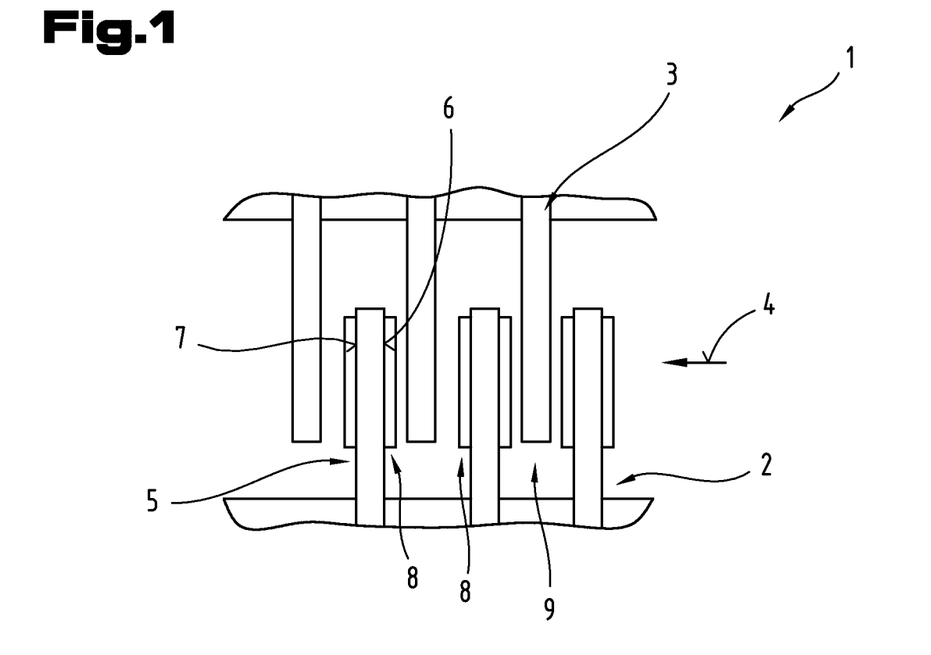
FIG. 1 lateral view of a cut-out from a pack of friction devices.

In FIG. 1, a cut-out from a pack 1 of friction devices is shown. The packet 1 comprises several inner discs 2 and several outer discs 3, which may also be referred to as friction devices. The inner discs 2 are arranged alternately with the outer discs 3 in an axial direction 4. By means of a corresponding actuating mechanism, the inner discs 2 are adjustable relative to the outer discs 3 in the axial direction 4, so that a frictional locking is formed between the inner discs 2 and the outer discs 3.

The inner discs 2 comprise a carrier element 5, which may at least partially be configured as a nearly flat, annular carrier disc. The carrier element 5 comprises a first surface 6 and a second surface 7 located opposite of the first surface 6 in the axial direction 4. Several friction lining segments 8 are arranged on at least one of the first surface 6 or the second surface 7, preferably on both. In the embodiment shown, the inner discs 2 are thus so-called lining discs.

The outer discs 3 comprise a disc body 9, which may at least partially be configured as a flat, at least nearly annular disc, and which is free of friction lining segments 8 in the embodiment shown. Thus, the outer discs 3 are the so-called counter discs, which may be frictionally locked with the friction lining segments 8 of the inner discs 2. However, it is also possible to arrange the friction lining segments 8 on the outer discs 3, especially if no friction lining segments 8 are arranged on the inner discs 2. In this case, the disc body 9 also forms a carrier element 5.

The carrier element 5 of the inner discs 2 and/or the disc body 9 of the outer discs 3 preferably consist of a type of steel or comprise it. However, they may also consist of another suitable, in particular metallic, material, for example of a sintered material.

This basic structure of the pack 1 of friction devices is known from prior art. For further details, reference is therefore made to this relevant prior art.

The pack 1 is part of a (disc) friction system, for example of a (wet) (disc) clutch, a brake, a holding device, a differential lock, etc.

Below, only the friction device will be discussed. Depending on the design of the pack 1, said friction device may be an inner disc 2 and/or an outer disc 3, as explained above.

It should be noted already at this point that the term friction device both comprises a friction disc as such and a clutch plate. Therefore, the friction device may be a friction disc or a clutch plate.

Figure 2:
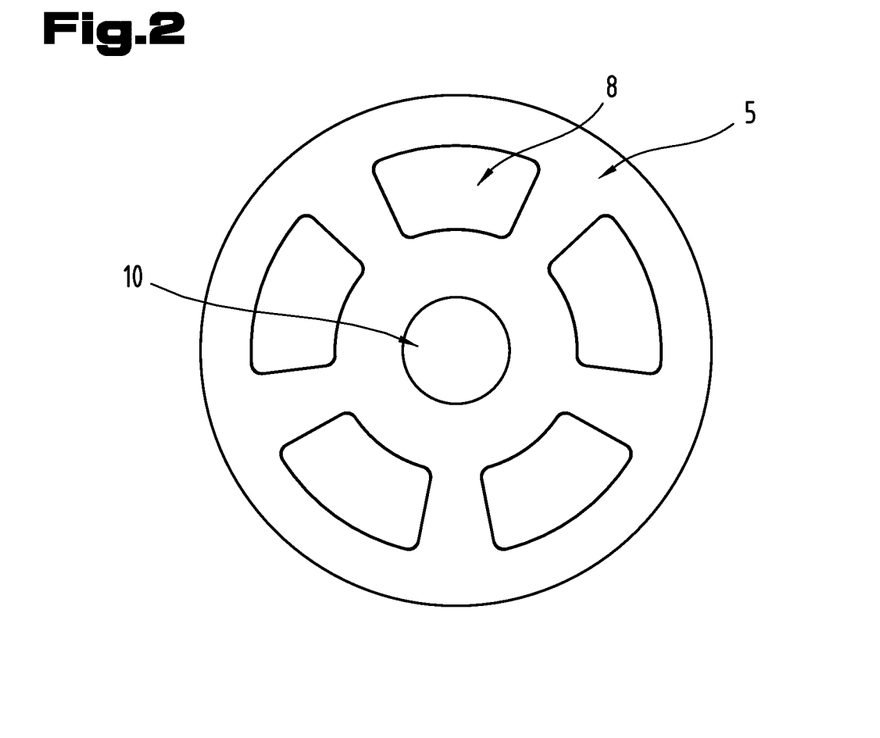
FIG. 2 a first embodiment of a friction device.

As shown by the representation in FIG. 2, the carrier element 5 may be at least one flat disc on which the friction lining segments 8 are mounted. The only recess which the carrier element 5 comprises is a central borehole 10 for arranging the friction device in the pack 1, for example on a shaft or a pin.

It should be noted at this point that both the inner disc 2 and the outer disc 3 preferably have drivers for arranging the inner disc 2 or the outer disc 3 in the pack 1 in a rotationally secure manner, as is known in principle. For this purpose, the inner disc 2 may comprise an inner toothing in the borehole 10. The outer disc may at least be partially provided with an outer toothing at the outer circumference of the disc body 9. However, other drivers/driver toothings are known as well, which may of course be used at the friction device.

Figure 3:
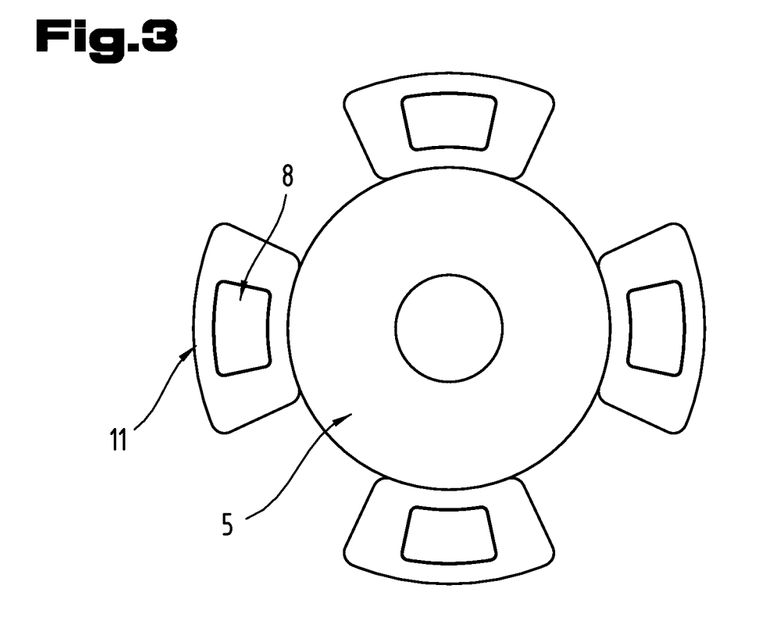
FIG. 3 a second embodiment of a friction device.

According to another embodiment of the friction device, it is also possible that several fastening tabs 11 are arranged distributed along the outer circumference of the carrier element 5, in particular evenly distributed, as shown in FIG. 3. On said fastening tabs 11, the friction lining segments 8 are arranged, wherein, depending on the size of the fastening tabs 11, one or several friction lining segments 8 may be arranged per fastening tab 11.

The fastening tabs 11 may be formed in one piece with the rest of the carrier element 5. However, it is also possible to manufacture the fastening tabs 11 as separate components and to connect, for example rivet them to the rest of the carrier element 5, i.e. the inner ring, as can be seen in FIG. 3.

Figure 4:
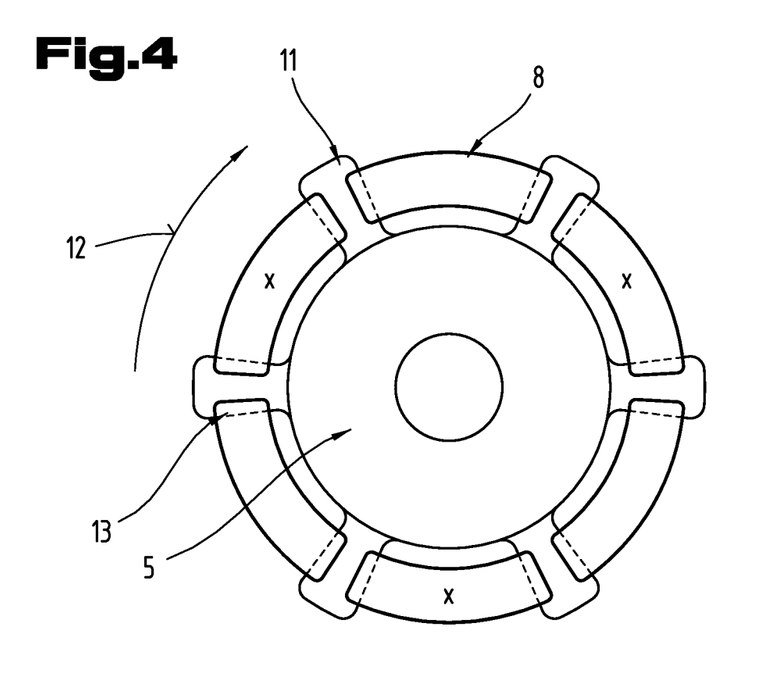
FIG. 4 a third embodiment of a friction device.

According to one corresponding embodiment of the friction device, it may be provided that the friction lining segments 8 are not entirely arranged on one respective fastening tab 11, but that the friction lining segments 8 and the fastening tabs 11 are alternately arranged in a circumferential direction 12, as can be seen in FIG. 4. In this regard, between the friction lining segments 8 and the fastening tabs 11 (viewed in the axial direction 4 (FIG. 1)), there are overlapping areas 13, in which the friction lining segments 8 are connected to the fastening tabs.

With this arrangement of the fastening tabs 11 and the friction lining segments 8, a ring element consisting of the friction lining segments 8 and the fastening tabs 11 and continuous in the circumferential direction 12 is formed, as can also be seen in FIG. 4.

In the embodiment of the friction device shown in FIG. 4, two fastening tabs 11 are thus respectively connected to each other in the circumferential direction 12 by means of a friction lining segment 8. However, a continuous ring element does not have to be necessarily formed in this regard, as described above, but spaces may be present as well. For example, every other friction lining segment 8 (viewed in the circumferential direction 12) may not be present, for example the friction lining segments 8 marked with an "x" in FIG. 4.

Figure 5:
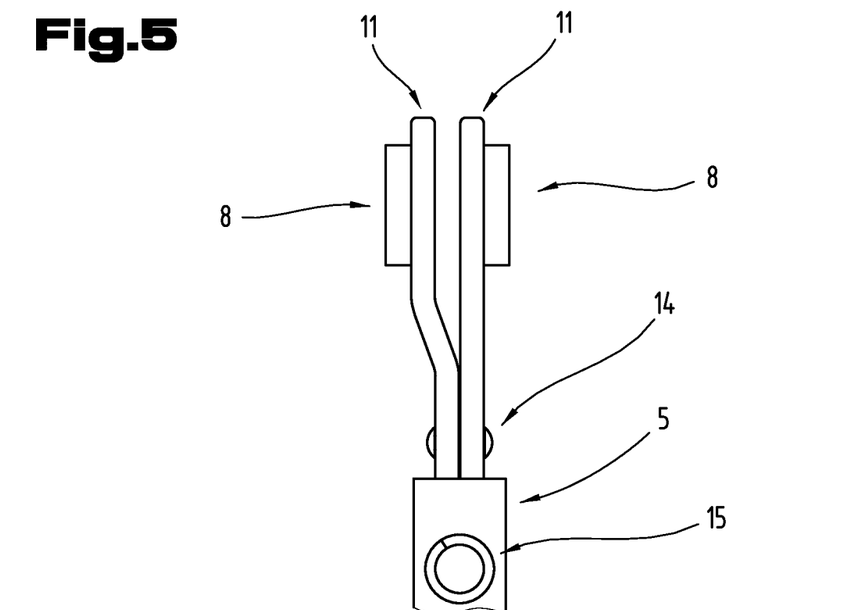
FIG. 5 a cut-out from a fourth embodiment of a friction device.

According to another embodiment of the friction device, cut-outs of which are shown in FIG. 5 (and which may also be referred to as clutch plate), it is possible that the friction disc comprises a rigid side (the right side in FIG. 5) and a flexible side (the left side in FIG. 5). The rigid side may be configured as an even carrier element 5 or as even fastening tabs 11. For example, the flexible side may be configured as angled fastening tabs 11, so-called lining spring elements, so that a distance is formed between the fastening tabs 11 of the right and the left side.

It should be noted that the right and the left side of the friction device are formed behind one another in the axial direction 4.

The angled fastening tabs 11 may also consist of a type of steel, for example of spring steel.

The fastening tabs 11 of the right and the left side may be connected to each other, for example by means of a rivet 14, as indicated in FIG. 5, or a screw, etc. Furthermore, they are connected to the rest of the carrier element 5, for example riveted or screwed, etc.

It should additionally be noted that torsion springs 15 may also be arranged in or at the carrier element 5, especially in the embodiment of the friction device according to FIG. 5. Arranging such torsion springs 15 in clutch plates is known in principle; therefore, reference is made to the relevant prior art for further details in this respect.

It should be pointed out that combined versions of the individual embodiments of the friction device shown in FIGS. 2 to 5 are possible as well. In particular, the respective fastenings of the friction lining segments 8 may also be selected accordingly in other embodiments as well. For example, the continuous ring element formed from the fastening tabs 11 and the friction lining segments 8 may be formed on the right and/or the left side (with reference to the representation in FIG. 5) in the embodiment of the friction device according to FIG. 5 as well.

In FIGS. 6 to 11, different embodiments of friction lining segments 8 are shown. Preferably, each friction lining segment 8 of the friction device comprises a sintered friction lining 16 and a friction lining carrier 17, or consists thereof.

Below, only one friction lining segment 8 will be described. However, the corresponding embodiments may be applied to all friction lining segments 8 of a friction device or of a side of the friction device.

The sintered friction lining 16 is arranged on the friction lining carrier 17 and bonded to it, for example sintered or glued onto it. Furthermore, the friction lining segment 8 with the friction lining carrier 17 is (detachably) connected to the carrier element 5, for example by means of at least one fastening tab 11. For the connection, several fastening elements 18 are provided, preferably at least four fastening elements 18 per friction lining carrier 17 or sintered friction lining 16.

In particular, the fastening elements 18 are rivets. However, it is also possible to seamlessly connect the friction lining carrier 17 to the carrier element 5. For this purpose, the fastening elements 18 may in particular be manufactured from the friction lining carrier 17 or the carrier element 5 by deep drawing, as described in AT 517 922 A1, for example, or by reshaping the friction lining carrier 17 or the carrier element 5, as described in AT 520 092 A4, for example.

Sintered materials for sintered friction linings are sufficiently known in principle; therefore, it is not necessary to discuss them.

The friction lining carrier 17 preferably consists of a type of steel.

According to a preferred embodiment of the friction disc, which is to be seen as an alternative or in addition to the embodiment described above, where two fastening tabs 11 are respectively connected to each other by means of the friction lining segments 8, the friction lining segment 8 has an angle coverage between 25° and 55°, in particular between 30° and 50°. In this regard, the angle coverage refers to the area of a circular ring that includes an angle 19 in said area. For example, the friction lining segment 8 according to FIG. 6 has an angle coverage of 50°; i.e. the angle 19 is 50°.

Figure 6:
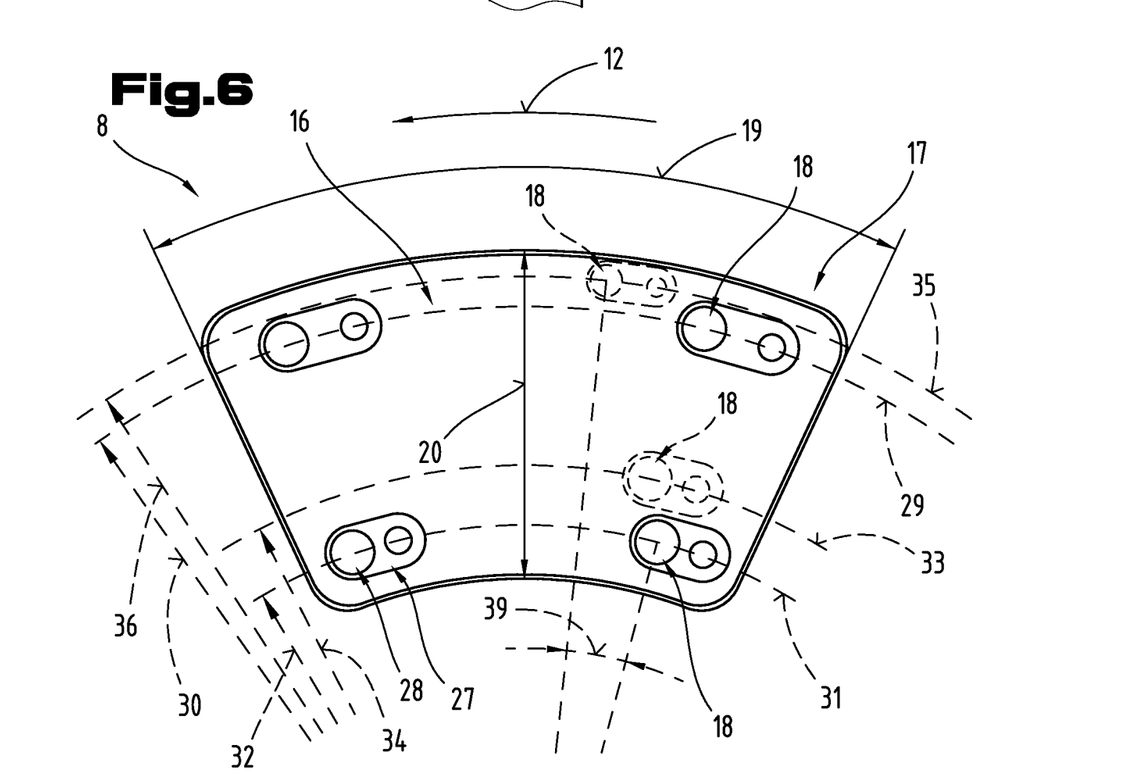
FIG. 6 a first embodiment of a friction lining element.

In the simplest embodiment of the friction lining segment 8, it is configured as a circular-ring section, as shown in FIG. 6. In this regard, a radial width 20 of the friction lining segment 8 is constant over the entire extension in the circumferential direction 12. According to embodiments of the friction device, however, it is also possible that this radial width 20 does not remain constant, i.e. that it varies. In this regard, both the friction lining carrier 17 and the sintered friction lining 16 may have a varying radial width 20. However, it is also possible that only the friction lining carrier 17 changes with respect to its radial width 20 in the course of the circumferential direction 12.

Figure 7:
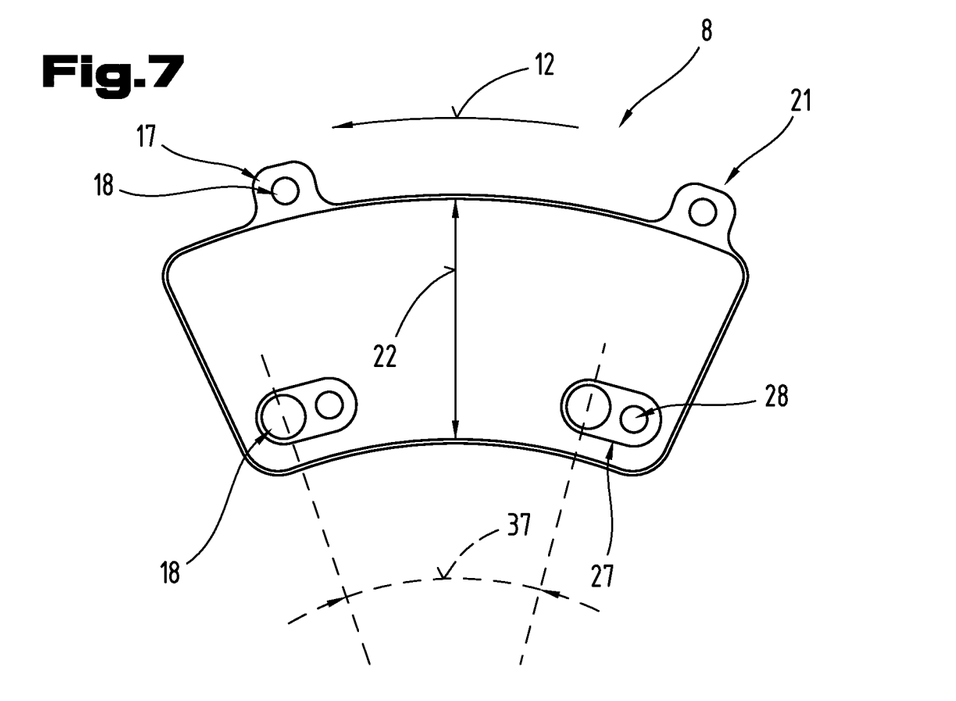
FIG. 7 a second embodiment of a friction lining element.

For example, it is also possible that the friction lining carrier 17, as in the friction lining segment 8 according to FIG. 7, comprises at least two tabs 21 protruding radially, in particular protruding radially outwards, which are in particular formed in one piece with the rest of the friction lining carrier 17. Alternatively or additionally, the friction lining carrier 17 may comprise one or several such tabs 21 also protruding radially inwards and/or in the circumferential direction 12. By contrast, the sintered friction lining 16 is formed with continuous radial lining width 22. The tabs 21 serve for mounting the friction lining segments 8 to the carrier element 5, for example to the fastening tabs 11 of the carrier element 5. Thus, the friction lining carrier 17 comprises fastening tabs on which no friction linings are arranged.

Figure 8:
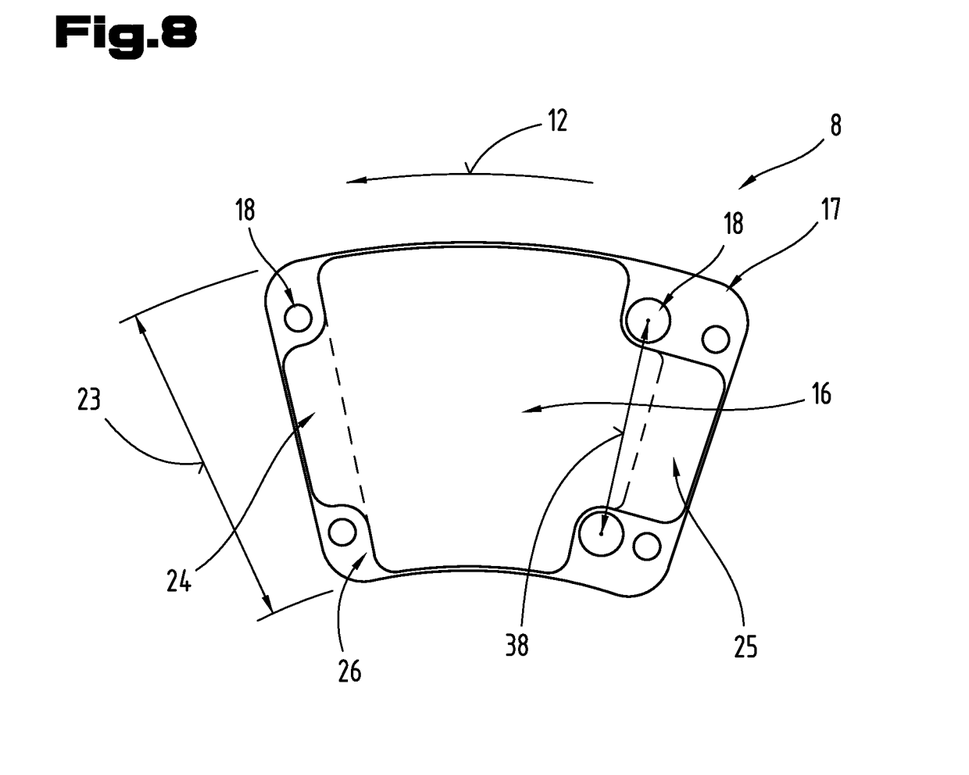
FIG. 8 a third embodiment of a friction lining element.

The opposite case is shown in FIG. 8. In this friction lining segment 8, a radial friction lining carrier width 23 remains unchanged in the circumferential direction 12 while the lining width 22 of the sintered friction lining 16 varies in the circumferential direction 12. Specifically, the sintered friction lining 16 comprises two tab-like (wing-like) areas 24, 25 projecting in the circumferential direction 12, in which areas the lining width 22 is smaller than in the remaining areas of the sintered friction lining 16. In this regard, the radial width of the area 24 may be equal or unequal to the radial width of the area 25. Moreover, it may also be provided, as represented with a dashed line in FIG. 8, that only one of the areas 24, 25 is present (which is the area 25 in FIG. 8). Moreover, the areas 24, 25 may also have a different longitudinal extension in the circumferential direction 12 than the one shown in FIG. 8, as is also shown with a dashed line in FIG. 8.

Furthermore, the longitudinal extension in the circumferential direction 12 of the area 24 may be smaller or larger than the longitudinal extension in the circumferential direction 12 of the area 25.

Figure 9:
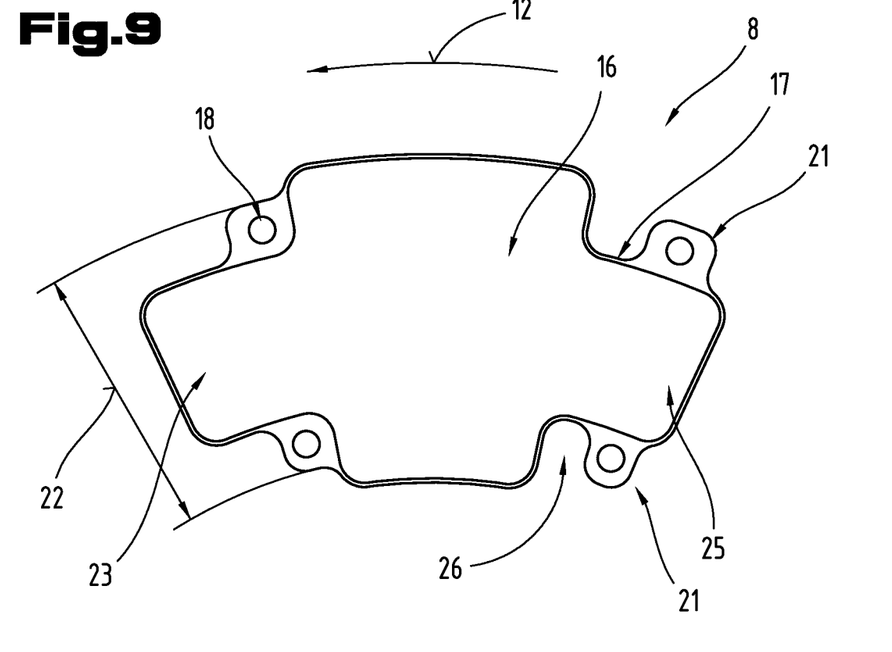
FIG. 9 a fourth embodiment of a friction lining element.

According to one corresponding embodiment, however, the two areas 24, 25 may also have the same length in the circumferential direction 12, as shown by the friction lining segment 8 according to FIG. 9. In addition, this embodiment of the friction lining segment 8 also shows very nicely that combinations of the individual embodiments of the friction lining segments 8 are possible. For example, the friction lining segment 8 according to FIG. 9 comprises tabs 21, as was described with respect to FIG. 7, which additionally may have different sizes with regard to their surface area. Thus, the friction lining carrier 17 may also comprise a radial friction lining carrier width 23 varying in the circumferential direction 12. The area of the friction lining segment 8 shown on the left side in FIG. 9 may be obtained from the embodiment of the friction lining segment 8 according to FIG. 8.

In addition, it should be noted that the embodiment of the friction lining segment 8 according to FIG. 8 has an angle coverage of approximately 32°.

It should be further noted that in all embodiments of the friction lining segment 8, the corners of the sintered friction lining 16 and/or the corners of the friction lining carrier 17 may be rounded, as shown in FIGS. 6 to 10. The resulting change in the radial width of the sintered friction lining 16 and/or the friction lining carrier 17, however, is not ascribed to the change in the radial lining width 22 or the change in the radial friction lining carrier width 23 described above. Thus—as described—, the friction lining segment 8 according to FIG. 6 does not comprise a change of a radial width.

Figure 10:
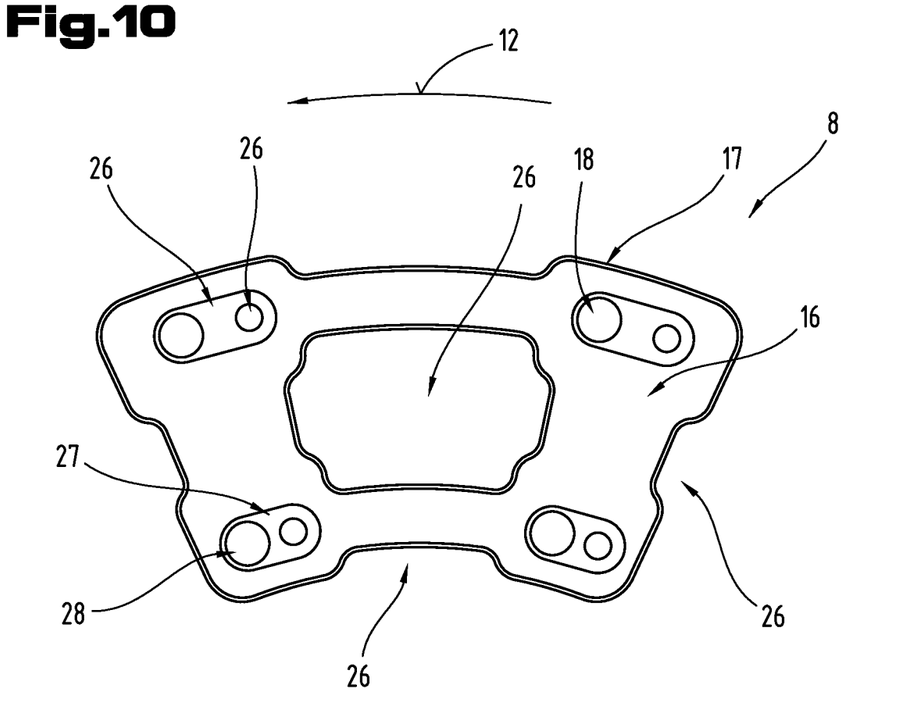
FIG. 10 a fifth embodiment of a friction lining element.

According to another embodiment of the friction device, the friction lining segment 8 may comprise at least one recess 26 in the sintered friction lining 16 and/or in the friction lining carrier 17, as shown in FIG. 10, among others. In this regard, the recess 26 may be in the area of the circumference of the friction lining segment 8, as shown by means of the four marginal recesses in FIG. 10. However, it is also possible that the recess 26 is formed within the sintered friction lining 16 and/or the friction lining carrier 17, as is also shown by FIG. 10 by means of the central recess 26 in the sintered friction lining 16 and in the friction lining carrier 17.

In this regard, it is possible that the recesses 26 in the sintered friction lining 16 and in the friction lining carrier 17 are superimposed viewed in the axial direction 4 (FIG. 1). However, they may also be offset against each other, so that the recess 26 in the friction lining carrier 17 may be at least partially covered by the sintered friction lining 16.

The recess 26 may extend only over a partial area of the thickness of the sintered friction lining 16 or be formed as a breakthrough through the sintered friction lining 16. Likewise, the recess 26 may extend only over a partial area of the thickness of the friction lining carrier 17 or be formed as a breakthrough through the friction lining carrier 17.

Moreover, in the sintered friction lining 16, recesses 26 may be provided, which are larger than the recesses 26 in the friction lining carrier at the location of the recesses 26 in the sintered friction lining 16. This preferably applies to the areas where the friction lining segments 8 are (detachably) mounted, in particular riveted, to the carrier element 5 or the fastening tabs 11. Thus, as shown in FIGS. 6, 7 and 10, the sintered friction lining 16 in these areas may be configured with an elongated hole 27, and the friction lining carrier 17 with at least one borehole 28. In this regard, it is also possible that more than one borehole 28 per elongated hole 27 is provided, for example two, wherein said boreholes 28 may also have different diameters.

The formation of the recess 26 may extend so far that the one sintered friction lining 16 per friction lining carrier 17 is divided into at least two separate sintered friction linings 16. In other words, per friction lining carrier 17, more than one sintered friction lining 17, for example two, may be arranged and bonded to the friction lining carrier 17.

By the formation of the at least one recess 26 in the sintered friction lining 16 and/or in the friction lining carrier 17, the mass of the friction lining segment 8 may be reduced while the size of the friction lining segment 8 remains the same.

Preferably, according to one embodiment of the friction disc, the sintered friction lining 16 has a surface area which is at least 5%, in particular between 5% and 25% smaller than the surface area of the friction lining carrier 17 in the plan view.

Alternatively or additionally, reducing the mass of the friction lining segment 8 may also be achieved by reducing the lining thickness of the sintered friction lining 16 and/or the thickness of the friction lining carrier 17 (each viewed in the axial direction 4).

Figure 11:
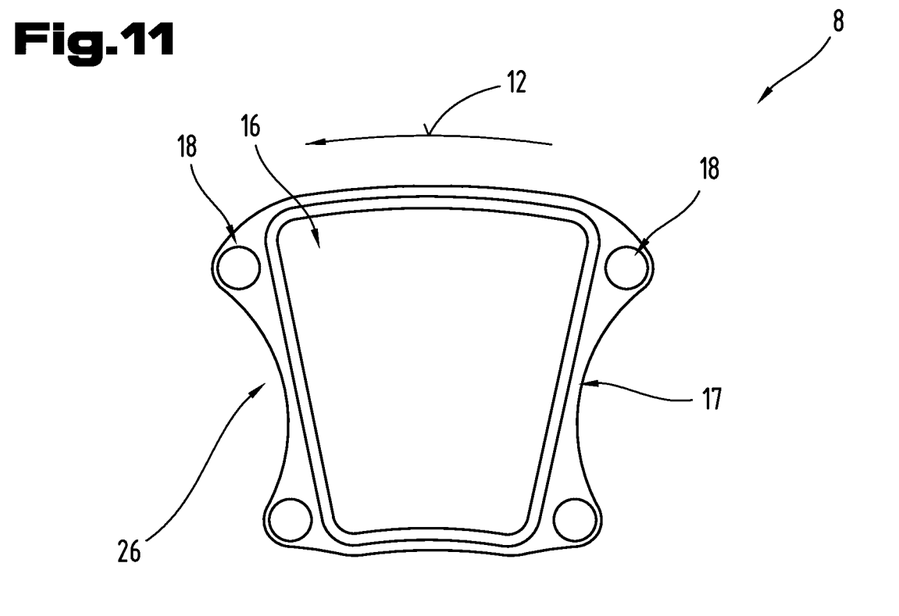
FIG. 11 a sixth embodiment of a friction lining element.

In FIG. 11, an embodiment of the friction lining segment 8 is shown wherein the sintered friction lining 16 is completely free of recesses 26 etc., as in the embodiment according to FIG. 9. The fastening elements 18 are all located adjacent to the sintered friction lining 16 in the area of the friction lining carrier 17. The latter may also comprise the recesses 26 in lateral areas. The sintered friction lining 16 has an at least nearly trapezoidal shape viewed in the axial direction 4 (FIG. 1).

With this embodiment of the friction lining segment 8 in particular, the existing mass inertia of the friction system may also be actively influenced.

In every embodiment of the friction device, the friction lining segment 8 comprises several fastening elements 18.

Returning to FIG. 6, it can now be seen that at least one first fastening element 18 is located on a first (radially outer) circular path 29 having a first diameter 30 and at least one fastening element 18 on a second (radially inner) circular path 31 having a second diameter 32. In this regard, it is provided that the ratio of the first diameter 30 of the first circular path 29 to the second diameter 32 of the second circular path 31 is selected from a range from 1.2 to 1.5, in particular from a range from 1.33 to 1.42.

In this regard, it may be provided according to an embodiment represented with a dashed line that two (or more) radially inner fastening elements 18 are arranged, wherein one is arranged on a third circular path 33 having a third diameter 34, wherein the third diameter 34 differs from the second diameter 32 by a value selected from a range of +/−3 mm.

According to another embodiment of the friction device, which is also represented with a dashed line in FIG. 6, it may be provided that two (or more) radially outer fastening elements 18 are arranged, wherein one is arranged on a fourth circular path 35 having a fourth diameter 36, wherein the fourth diameter differs from the first diameter 30 by a value selected from a range of +/−5 mm.

In other words, the radially inner fastening elements 18 and/or the radially outer fastening elements 18 may be arranged on different radial heights.

Preferably, the first circular path 29 and the second circular path 31 are concentric to each other. Likewise, the third circular path 33 and/or the fourth circular path 35 may be concentric to the first and/or the second circular path 29, 31.

As can be seen from FIG. 7, it may be provided according to another embodiment of the invention that fastening elements 18 arranged (directly) adjacent to each other in the circumferential direction 12 include an angle 37 from a range from 22° to 38°, in particular from 25° to 34°. In this regard, the angle 37 is measured between the radius lines running through the centers of the fastening elements 18, as can be seen in FIG. 7.

According to another embodiment of the friction device, it may be provided that a radial distance 38 between two fastening elements 18 is between 60 mm and 110 mm, as can be seen in FIG. 8. In this regard, the radial distance 38 is measured between the centers of the fastening elements 18.

Another embodiment of the friction device is again shown in FIG. 6. In this regard, it may be provided that a radially outer fastening element 18 is offset by an offset angle 39 to a radially inner fastening element 18 in the circumferential direction 12 of the friction device. According to a corresponding embodiment, the offset angle 39 may be selected from a range of +/−2°. In this regard, the offset angle 39 is measured between the radius lines running through the centers of the fastening elements 18, as can be seen in FIG. 6.

It may further be provided that a diameter of the receptions of the fastening elements 18 in the friction lining carrier 17 is selected from a range from 5 mm to 8 mm.

It should be pointed out that the individual embodiments of the friction device, in particular of the friction lining segment 8, are shown in different figures. However, this was only done for better presentation. The individual embodiments of the invention may be applied to all geometric designs of the friction lining segments 8.

It should further be noted that the described friction lining segment 8 with the sintered friction lining 16 and the friction lining carrier 17 may also constitute an independent invention also without the entire friction device.

The exemplary embodiments show possible embodiments of the friction device; however, it should be noted at this point that combinations of the individual embodiments are possible as well.

As a matter of form, it should finally be noted that, for better understanding of the structure, the pack 1 of friction devices or the friction device are not necessarily shown to scale.

Although only a few embodiments of the present invention have been shown and described, it is to be understood that many changes and modifications may be made thereunto without departing from the spirit and scope of the invention.

| List of reference numbers | |
|---|---|
| 1 | Pack |
| 2 | Inner disc |
| 3 | Outer disc |
| 4 | Axial direction |
| 5 | Carrier element |
| 6 | Surface |
| 7 | Surface |
| 8 | Friction lining segment |
| 9 | Disc body |
| 10 | Borehole |
| 11 | Fastening tab |
| 12 | Circumferential direction |
| 13 | Overlapping area |
| 14 | Rivet |
| 15 | Torsion spring |
| 16 | Sintered friction lining |
| 17 | Friction lining carrier |
| 18 | Fastening element |
| 19 | Angle |
| 20 | Width |
| 21 | Tab |
| 22 | Lining width |
| 23 | Friction lining carrier width |

-continued

| List of reference numbers | |
|---|---|
| 24 | Area |
| 25 | Area |
| 26 | Recess |
| 27 | Elongated hole |
| 28 | Borehole |
| 29 | Circular path |
| 30 | Diameter |
| 31 | Circular path |
| 32 | Diameter |
| 33 | Circular path |
| 34 | Diameter |
| 35 | Circular path |
| 36 | Diameter |
| 37 | Angle |
| 38 | Distance |
| 39 | Offset angle |

The invention claimed is:

1. A friction device having a carrier element and friction lining segments arranged thereon, wherein the friction lining segments each comprise a sintered friction lining arranged on a friction lining carrier, the friction lining carrier being connected to the carrier element by means of fastening elements, and several fastening elements being arranged per friction lining segment, wherein one fastening element is located on a first circular path having a first diameter, and one fastening element is located on a second circular path having a second diameter, wherein the ratio of the first diameter of the first circular path to the second diameter of the second circular path is selected from a range from 1.2 to 1.5.

2. The friction device according to claim 1, wherein fastening elements arranged adjacent to each other in the circumferential direction of the friction device include an angle from a range from 22° to 38°.

3. The friction device according to claim 1, wherein a radial distance between two fastening elements is between 60 mm and 110 mm.

4. The friction device according to claim 1, wherein a radially outer fastening element is offset by an offset angle to a radially inner fastening element in the circumferential direction of the friction device.

5. The friction device according to claim 4, wherein the offset angle is selected from a range of +/−2°.

6. The friction device according to claim 1, wherein two radially inner fastening elements are arranged, wherein one is arranged on a third circular path having a third diameter, wherein the third diameter differs from the second diameter by a value selected from a range of +/−3 mm.

7. The friction device according to claim 1, wherein two radially outer fastening elements are arranged, wherein one is arranged on a fourth circular path having a fourth diameter, wherein the fourth diameter differs from the first diameter by a value selected from a range of +/−5 mm.

8. The friction device according to claim 1, wherein the sintered friction linings are provided with recesses, which are free of fastening elements.

9. The friction device according to claim 1, wherein it is configured as a friction disc or a clutch plate.

10. A pack of friction devices comprising friction devices in the form of outer discs and inner discs alternately arranged in an axial direction, wherein at least one of the friction devices is formed according to claim 1.

11. The friction device according to claim 1, wherein the sintered friction linings are provided with breakthroughs which are free of fastening elements.

\* \* \* \* \*